No. 834,404. PATENTED OCT. 30, 1906.
F. B. RAE.
SIGNALING SYSTEM.
APPLICATION FILED AUG. 5, 1901.

Witnesses
Chas. A. Horn.
Ralph Jonas

Inventor
Frank B. Rae
By his Attorney
C. V. Edwards

No. 834,404. PATENTED OCT. 30, 1906.
F. B. RAE.
SIGNALING SYSTEM.
APPLICATION FILED AUG. 5, 1901.

Witnesses
Chas. A. Horn.
Ralph Jonas

Inventor
Frank B. Rae
By his Attorney
C. V. Edwards.

No. 834,404. PATENTED OCT. 30, 1906.
F. B. RAE.
SIGNALING SYSTEM.
APPLICATION FILED AUG. 5, 1901.

Witnesses
Chas. A. Horn
Ralph Jonas

Inventor
Frank B. Rae
By his Attorney
C. V. Edwards.

No. 834,404. PATENTED OCT. 30, 1906.
F. B. RAE.
SIGNALING SYSTEM.
APPLICATION FILED AUG. 5, 1901.

Witnesses
Chas. A. Horn.
Ralph Jonas

Inventor
Frank B. Rae
By his Attorney
C. V. Edwards

UNITED STATES PATENT OFFICE.

FRANK B. RAE, OF RIDGEWOOD, NEW JERSEY, ASSIGNOR TO RAE ELECTRIC & MANUFACTURING COMPANY, A CORPORATION OF NEW YORK.

SIGNALING SYSTEM.

No. 834,404.    Specification of Letters Patent.    Patented Oct. 30, 1906.

Application filed August 5, 1901. Serial No. 70,850.

*To all whom it may concern:*

Be it known that I, FRANK B. RAE, a citizen of the United States, residing at Ridgewood, in the county of Bergen and State of New Jersey, have invented certain new and useful Improvements in Signaling Systems; of which the following is a full, clear, and exact specification.

This invention relates to signaling systems; and its object is to provide an automatic signaling system which shall be simple in its construction, positive and efficient in its operation, and which shall be readily adaptable to practical conditions.

The invention herein described is peculiarly applicable for use in connection with electric-railway systems, and particularly such systems as extend into country districts, where the cars are run at such high rates of speed as to require a signaling system.

The invention is herein described as applied to a single-track trolley-road, but obviously may be applied to double-track systems or to other railway systems.

The invention also comprehends the employment of registering devices whereby the operation of each signal will be registered or otherwise noted in the car as it passes each signal-station, whereby the motorman may take note of the operation of the signals and the despatcher at the power-house may find a register upon each car showing whether the signals at the various stations have been properly operated or not.

The invention will be described more particularly with reference to the accompanying drawings, in which—

Referring more particularly to the drawings, 1 represents the shaft upon which the semaphore-arm 2 is carried. At each signal-station is a case 3, in the walls of which the shaft 1 is journaled. Upon the shaft 1 is mounted the armature 4 of an electric motor of any suitable type. In the drawings I have shown this motor as comprising the field-magnet frame of two parts 5 and 6, each having the brace 7, in which is formed a bearing for the armature-shaft 1, and the parts 5 and 6 having the inwardly-projecting pole-pieces 8, upon which are placed the two coils 9 and 10, wound concentrically with the shaft 1 and in opposite directions to each other. The armature-windings are connected in the usual manner to the commutator or collector rings 11, against which the brushes 12 and 13 are adapted to contact.

Figure 4:
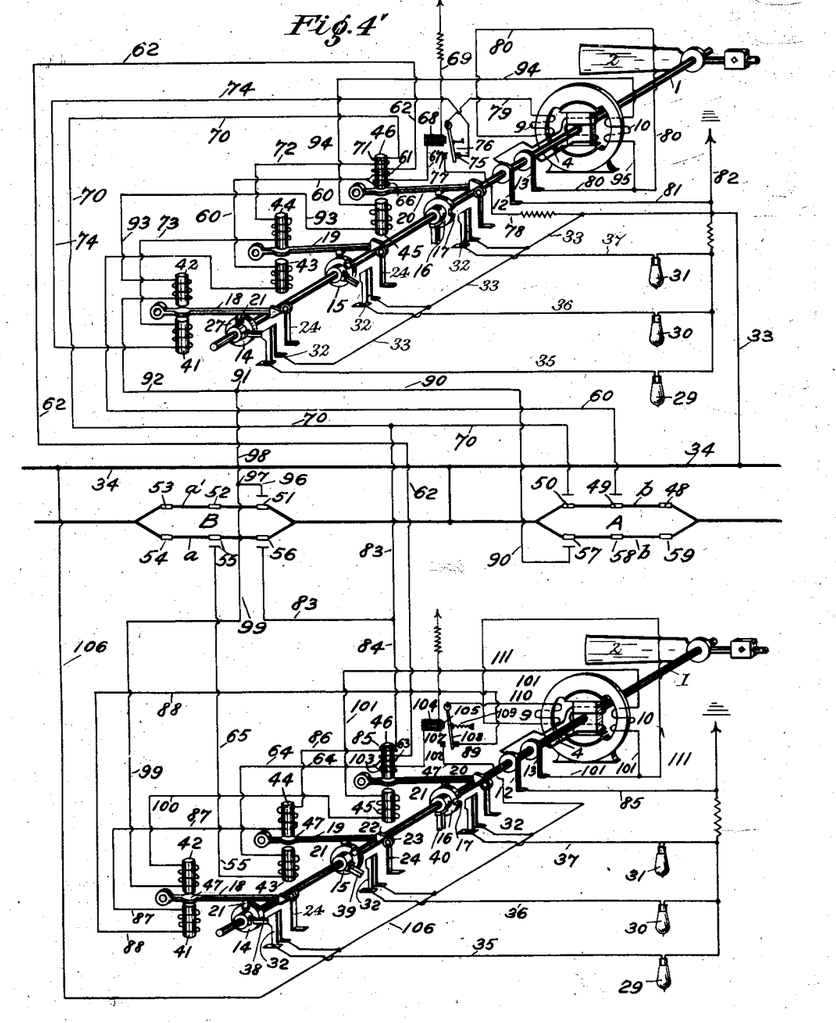
Fig. 4 is a diagram of the connections between two signal-stations, showing in perspective the signal-moving mechanism.
Figure 5:
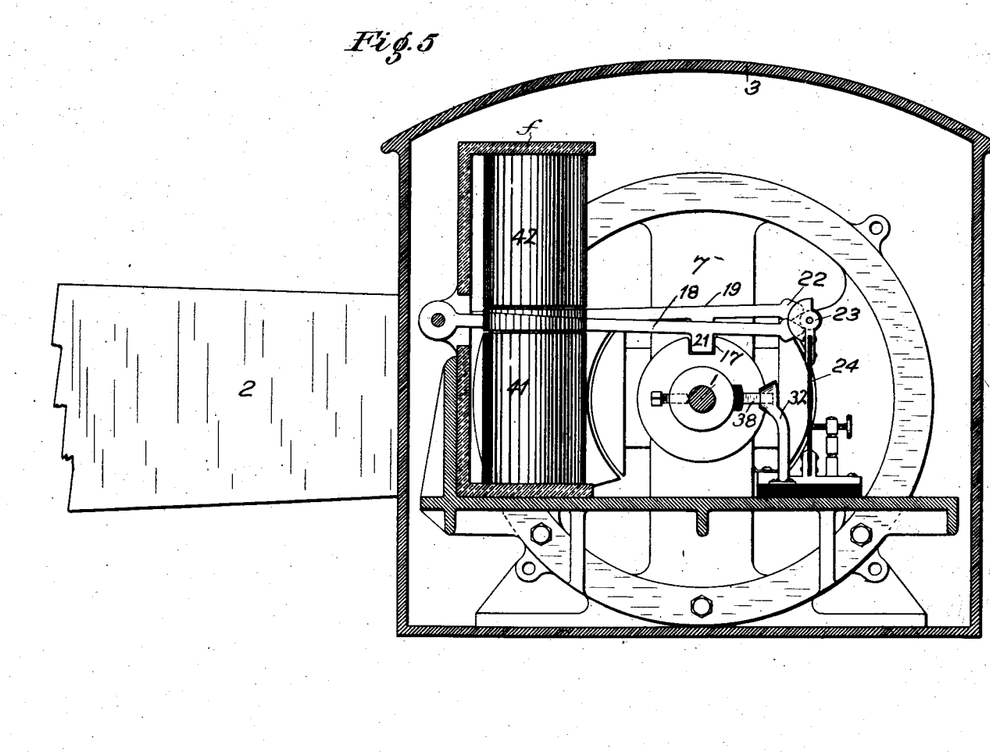
Fig. 5 is a side view, partly in section, of the signal-moving mechanism at one of the stations.
Figure 6:
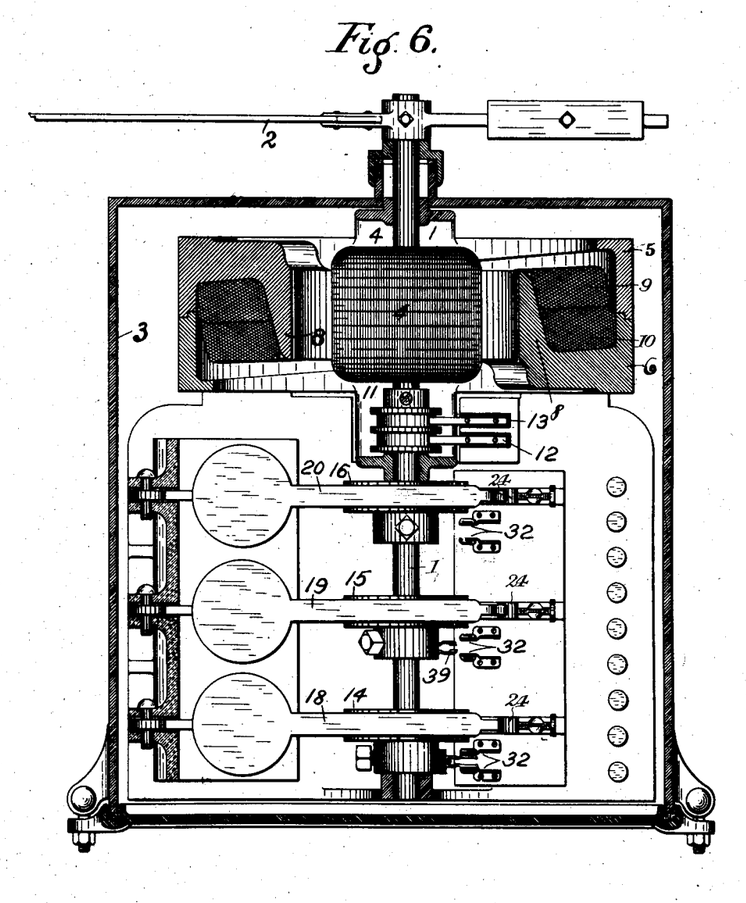
Fig. 6 is a plan sectional view of the mechanism shown in Fig. 5.
Figure 7:
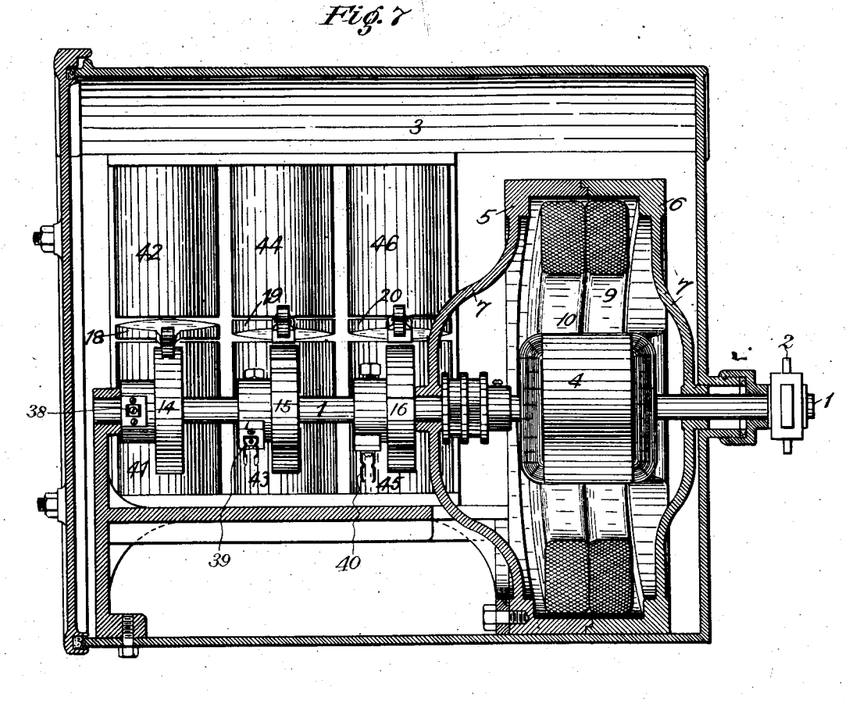
Fig. 7 is an interior view, partly in section, of the same mechanism.
Figures 8, 9, 10:
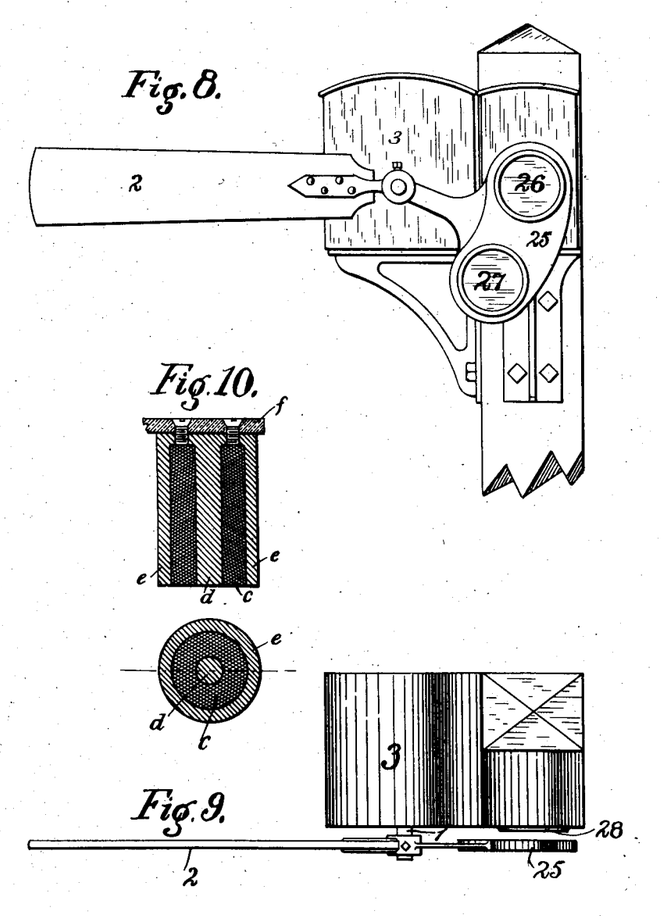
Fig. 8 is a detail view of one of the semaphore-boxes.
Fig. 9 is a top view of the same.
Fig. 10 is a detail sectional view of one of the magnets.

Upon the shaft 1 inside the casing 3 are mounted three disks 14, 15, and 16, in periphery of each of which is cut a notch 17. Adjacent to each of said disks 14 15 16 are pivoted three locking-arms 18, 19, and 20, each of which is provided with a projection 21, adapted to engage notch 17 of the wheel to which said locking-arm is adjacent. The notches 17 and projections 21 are so located that when the semaphore-arm 2 is in the danger position, as shown in Fig. 4, the notch 17 on the disk 14 will be in position to be engaged by the projection 21 on the locking-arm 18. When the semaphore-arm 2 is in the caution position, the notch 21 on disk 15 will be in position to be engaged by the projection 21 on the locking-arm 19, and when the semaphore-arm 2 is in the safety position the notch 17 on disk 16 will be in position to be engaged by the notch 21 on locking-arm 20. Suitable means for normally holding each locking-arm into or out of engagement with its respective disk except when operated by the magnets, as hereinafter described, are provided. A convenient arrangement is that shown in the drawings, wherein each arm is provided with a pointed end 22, against which the roller 23, carried by an elastic support 24, is carried. By this arrangement when the locking-arm is raised or lowered it forces back the roller 23 until the arm is into or out of engagement with a disk, at which time the roller bears against the proper pivotal side of the point 22 to hold the arm against improper movement.

Upon the shaft 1 may also be mounted the usual frame 25, carrying the red and green glasses 26 and 27, whereby when the semaphore-arm is in danger position the red glass 26 will be immediately in front of the lamp 28, and when the semaphore-arm is dropped to caution position the green glass 27 will be in front of the light 28. When the semaphore-arm 2 is dropped to safety position, the entire frame 25 is moved away from the lamp 28. Instead of this arrangement, however, separate red, white, and green lamps 29, 30, and 31 may be located in the casing. Circuits for such lamps are shown in Fig. 4, wherein 32 32 32 represent pairs of switch-jaws, one jaw of each pair being connected with wire 33 at station A and with wire 106 at station B, which wires take current from the trolley-wire 34. The other jaw of each pair is connected by wire 35, 36, or 37 with the respective red, green, or white lamp 29, 30, or 31. The switch-blade 38 is so located upon shaft 1 that when the latter is in the danger position the blade will make contact with the adjacent pair of jaws 32, and thus close the circuit through the red lamp. Switch-blades 39 and 40 are respectively so located upon shaft 1 as to close the circuit through the green or white lamp circuit when the shaft is in the caution or safety position.

Immediately above or below each of the locking-arms 18, 19, or 20 is located a pair of electric magnets, which are numbered in the drawings, respectively, 41 and 42, 43 and 44, and 45 and 46. These magnets are adapted to influence an armature 47, carried by the respective locking-arms and preferably comprise the body of magnetic material having an annular recess to receive the winding c, the body thus having a central pole-piece d and annular outer pole-piece e, the frame being bolted to the support f.

At each signal-station the usual turn-outs are provided. For illustration, in the drawings A represents one station and B another station. At station A the track divides into two branches a' and a², and at station B the track divides into branches b and b'. In each branch of the track are located contacts, numbered in the drawings 48 to 59, inclusive, from which connections are made to the magnets and motor for operating the proper signal. From contact 49 a wire 60 leads to and through the coil on magnet 43 and thence to magnet 46, where it divides into two branches, one of which includes coil 61 around magnet 46, and thence leads by wire 62 to and through coil 63 on magnet 46 at station B, and thence by wire 64 to and through the coil on magnet 43 at said station B, and thence by wire 65 to the contact 55. The other branch from wire 60 at station A passes through coil 66 around magnet 46, wound in an opposite direction to coil 61, and thence leads by wire 67 around the magnet 68 and thence to ground.

From contact 50 at station A a wire 70 leads to and through the coil 71 upon magnet 46, and thence by wire 72 to and through the coil upon magnet 44, thence by wire 73 to and through the coil upon magnet 41, thence by wire 74 to the contact-point 75. A switch-blade 76, which is under the influence of the magnet 68, is normally held by spring-pressure or otherwise in contact with the contact 75, but is adapted when the magnet 68 is energized to be drawn away from contact 75 and into engagement with the contact 77. Contact 77 is connected with the line by wires 78 and 33. From the switch-blade 76 a wire 79 leads to and through the field-coil 9 upon the motor, and from thence a wire 80 leads to the brush 13. From brush 12 wires 81 and 82 lead to the ground. From the wire 70 a wire 83 leads to the contact 56 at station B, and at this station a wire 84 leads from wire 83 to and around the coil 85' on magnet 46, from whence wire 86 leads to and through the coil upon magnet 44. Thence wire 87 leads to and through the coil on magnet 41, and thence wire 88 leads to the contact 89.

From the contact 57 at station A the wire 90 leads to the point 91, from whence wire 92 leads to and through the coil on magnet 42. Thence wire 93 leads to and through the coil around magnet 45, and thence wire 94 leads to and through the field-magnet coil 10 on the motor, and by wire 95 connects with wire 80, which leads to the brush 13 of the motor.

From contact-point 51 at station B a wire 92 leads to the point 97, and from thence wire 98 leads back to station A, where it connects with wire 90 at point 91. From the point 97 wire 99 leads to and through the coil on magnet 42, from whence wire 100 leads to and through the coil on magnet 45, and thence wire 101 leads to and through the field-coil 10 on the motor, and from thence it leads to the brush 13. From wire 64 the wire 102 leads to and through the coil 103 on magnet 46, and thence to and through the coil 104 of magnet 105, and thence to the ground.

A wire 106 leads from the feeder 34 at station B to the contact-jaws 32 at that station and also to the contact 107. The switch-blade 108 is adapted to be drawn by the influence of magnet 104 against contact 107 and by the spring 109 against the contact 89. From the switch-blade 108 a wire 110 leads to and through the field-coil 9 upon the motor, and from thence wire 111 leads to wire 101, which connects with the brush 13.

Figures 11, 12:
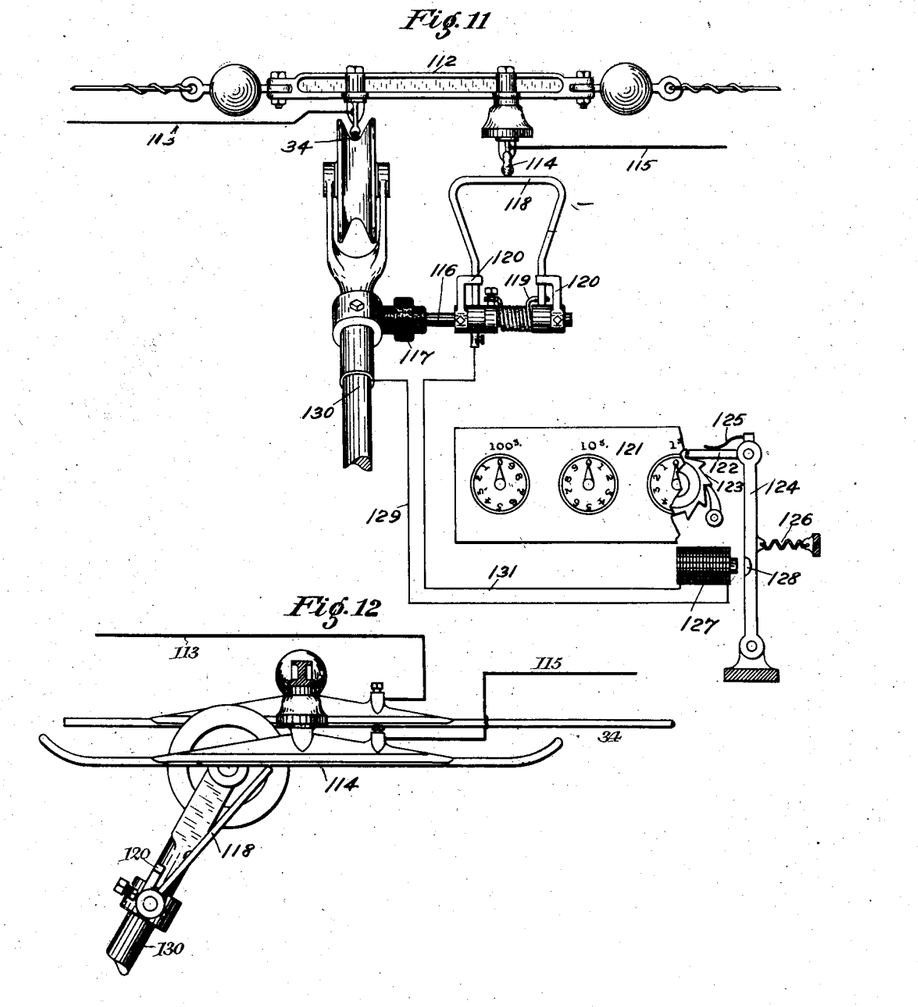
Fig. 11 is a detail view of the mechanism for registering the operations of the signals in the car.
Fig. 12 is a side view of the trolley connections shown in Fig. 11.

In Fig. 11, 112 represents a bridge-piece at one of the stations from which the main-line conductor 34 is suspended. 113 represents a feeder-wire to the main-line conductor. Upon the bridge-piece 112 is suspended a contact-shoe 114, connected by wire 115 to ground through the motors, as before described—i. e., through the respective wires 60 70 96 65 83 90. This contact-shoe is the same as contacts 48 to 59, inclusive, three contacts being arranged in succession at each station, as before described. To the trolley-pole is fixed an arm 116, insulated from the pole by insulation 117, and upon the arm 116 is pivoted a frame 118, of conducting material, adapted to engage the shoe 114 and be held in engagement therewith by the spring 119. 120 120 are arms fixed to the arm 116 and adapted to limit the movement of the frame 118. 121 represents a registering mechanism of any suitable description. In the drawings this registering mechanism is shown as operated by a pawl 122, engaging a ratchet-wheel 123 upon the units-dial. The pawl 122 is pivoted to an arm 124, which carries a spring 125, adapted to hold the pawl in engagement with the ratchet-wheel. A spring 126 tends to draw the arm 124 and pawl 122 away from the ratchet, while a magnet 127 is adapted when energized to attract an armature 128 upon the arm 124 and the arm against the force of the spring 126, thus moving the units-dial one step. The registering mechanism just described is located in any convenient place in the car, and a wire 129 leads from the trolley-pole 130 to the magnet 127, from whence a wire 131 leads to and makes connection with the frame 118.

Figure 3:
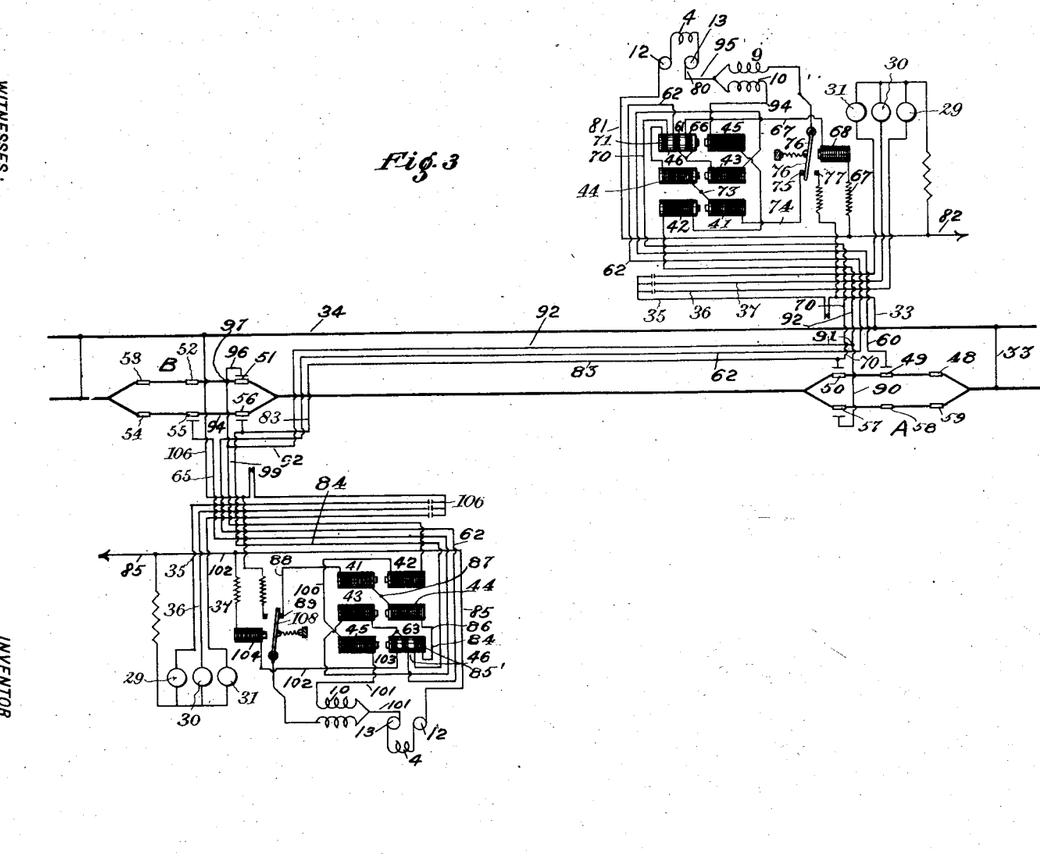
Fig. 3 is a diagram showing the connections between two signal-stations.

The operation of the system above described is substantially as follows: When the car enters the station, it is desirable that it shall first set the signal at the station behind at "safety," in order to indicate to the car behind that the block is clear. Then the car should set the signal at the station ahead at "caution," in order to indicate to any approaching car at the station ahead that a car is about to enter the intermediate block. Then as the car leaves the station it should set the signals both at that station and at the station ahead at "danger," in order to indicate that a car is in the intermediate block. These operations should take place no matter which direction the car may be traveling in. Assume the car a to be entering the signal-station B, when it reaches the contact 51 a circuit is established back to station A, which circuit is shown in Fig. 3 or Fig. 4, and is as follows: from the feeder-wire 34 through the car to contact 51, thence by wires 96, 98, and 92 to and through the coil on magnet 42, thence by wire 93 to and through the coil on magnet 45, thence by wire 94 to and through the field 10 upon the motor at station A, thence by wires 95 and 80 to the commutator-brush 13, thence through armature 4 of the motor to commutator-brush 12, and thence by wires 81 and 82 to ground. This circuit being established the locking-arm 18 at station A is pulled up by magnet 42, and the locking-arm 20 is pulled down by magnet 45. Locking-arm 19 will be held out of engagement with the disk 15. At the same time the energizing of the field 10 and the armature 4 of the motor will cause the motor to rotate the shaft 1 in the direction to move the signal to safety position. When the motor has moved the shaft the proper distance, the projection 21 upon the locking-arm 20 will engage the notch 17 upon the disk 16, thus locking the signal in the safety position. The movement above described is permitted by reason of the unlocking of the signal from the danger position by the raising of the locking-arm 18. At the same time the corresponding circuit is established at station B to move the signal at that station to the safety position. This circuit will be as follows: from contact 51 by wires 96 and 99 to and through the coil on magnet 42 at station B, thence by wire 100 to and through the coil on magnet 45, thence by wire 101 to and through the field 10 of the motor at station B, and thence to the commutator-brush 13, through armature 4, to commutator-brush 12, and thence by wire 85 to ground. This circuit will raise the locking-arm 18 and draw down the locking-arm 20 and will have energized the motor to move the signal to safety position, as before described with reference to station A.

When the car moves farther into the station, the circuits established to set the signal at the station ahead at "caution" are substantially as follows, the circuit being described with reference to the car being upon contact 49 at station A instead of upon contact at 52, because the circuits will be the same for both contacts: From the trolley-wire 34 the circuit lies through the car to contact 49, thence by wire 60 to and through the coil upon magnet 43, and thence to magnet 46, where it divides, one path leading through the coil 66 upon magnet 46, thence by wire 67 to and through the coil on magnet 68, thence by wires 69 and 82 to ground, the other part leading through coil 61 on magnet 46, thence by wire 62 and station B, where it leads to and through the coil 63 on magnet 46 at station B, thence to and through the coil 103 on magnet 46, and thence by wire 102 to and through the coil on magnet 104 to wire 85, and thence to ground. This circuit does not unlock the signal from the safety position at station A, because the current divides at magnet 46, and the coils therein being wound in opposite directions no effect is produced upon magnet 46. That portion of the current which goes to station B, however, passes through the coils 63 and 103 in series, and thus energizes magnet 46 to raise locking-arm 20 with its projection 21 out of engagement with the disk 16. At the same time the magnet 104 being energized draws the contact-blade 108 into engagement with the contact-point 107, and this establishes the circuit through the motor, as follows: from trolley-wire 34 by wire 106 to contact-point 107, then by contact-blade 108 and wire 110 through the field-coil 9 upon the motor, then by wire 111 to wire 101, then commutator-brush 13, armature 4, commutator-brush 12, and wire 85 to ground. This motor-circuit being established the signal at station B is rotated to the caution position, indicating to any car entering station B toward station A that a car is in the station at station A and may be about to enter the block between the two stations.

Figures 1, 2:
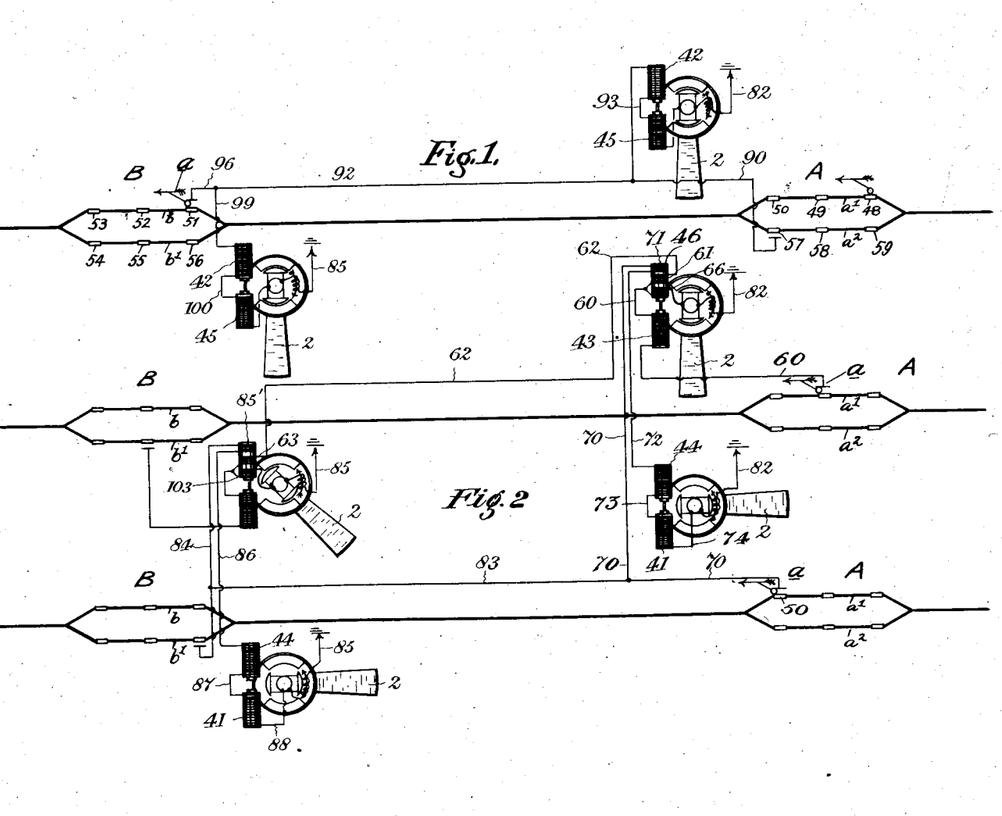
Figure 1 is a diagram showing the circuits for the safety-signal.
Fig. 2 is a diagram showing the circuit connections for the caution and danger signals.

When the car in station A moves upon the contact 50, the signals at both stations are set at the danger position by substantially the following circuit: at station A from contact 50 by wire 70 to the coil 71 upon magnet 46, thence by wire 72 to and through the coil upon magnet 44, thence by wire 73 to and through the coil on magnet 41, thence by wire 74 to contact 75 and switch-blade 76, which is held against said contact by its spring because of the magnet 68 not being energized at this time. From contact-blade 76 the circuit leads by wire 79 to and through the field-coil 9 upon the motor, and thence by wire 80 to commutator-brush 13 through the armature 4 to commutator-brush 12, and thence by wires 81 and 82 to ground. This circuit being established, locking-arms 19 and 20 are raised and locking-arm 18 drawn down, so that when the motor has moved the signal around to the danger position the signal will be located in that position. At the same time a circuit is established at station B, substantially as follows: from contact 50 by wires 70, 83, and 84 to and through the coil 85 upon magnet 46 at station B, thence by wire 86 to and through the coil upon magnet 44, thence by wire 87 to and through the coil upon magnet 41, thence by wire 88 to contact 89, through switch-blade 108 and wire 110 to the field 9 upon the motor, thence by wires 111 and 101 to commutator-brush 13 through armature 4 to commutator-brush 12, and thence by wire 85 to ground. This circuit moves the signal at station B to danger position, as heretofore described, The positions of the signal, as above described, are illustrated in diagram in Figs. 1 and 2, which show the car a entering station B and setting the signal at both stations A and B in the safety position. When the car advances farther into the block, as shown at station A in Fig. 2, the circuits do not effect the signal at station A, but set the signal at station B at "caution." When the car is about to leave the block, the signals at both stations are set at "danger."

The same sequence of operations is effected when the car moves in the opposite direction.

As before stated, a lamp located at the signal-box may be covered by the respective red and green glasses 26 and 27, or, if preferred, the colored red, green, and white lamps 29, 30, and 31 may be employed. In the latter case when the signal is in danger position, as shown in Fig. 4, the switch-blade 38 will close the contacts 32, and thus establish a circuit from the feeder-wire 34 through wire 106 to contacts 32, and thence by wire 35 through lamp 29 to ground. When in caution and safety positions, the switch-blades 39 and 40 would, respectively, close the circuits through lamps 36 or 37.

Each car should as it passes through each signal-station successively make three contacts and establish corresponding circuits. The performance of these operations may be registered by providing in each car the registering mechanism shown in Fig. 11, wherein as the car passes each contact at the station it will establish a circuit from the line 34 through the trolley by way of wire 129 to and through the coil 127, and thence by wire 131, frame 118, contact 114, and wire 115 to ground. This circuit being established, magnet 127 is energized to move the lever 124, which moves the ratchet-wheel 123 of the registering-dials one step. Noting the number of contacts that should be made during the run, the superintendent may note that the car has not performed all the operations at each signal-station unless the register shows the proper number upon its dials. To insure effectiveness of operation, the contact 114 should be made the same contact as the contacts 48 to 59 heretofore described.

It will be understood that the invention above described is capable of various modifications and rearrangements without departing from the spirit of the invention, and I therefore do not limit myself herein to the precise construction herein shown.

Having thus described my invention, I declare that what I claim as new, and desire to secure by Letters Patent, is—

1. In a railway signaling system, the combination with a car, of a plurality of independent circuits, an electric motor having a separate winding in each circuit, and adapted when energized to cause the motor to move to a certain definite position, a signal operated by said motor and having positions corresponding to the motor positions, and a contact controlled by the position of the car for automatically closing said circuits successively to thereby positively move the signal to its successive positions, substantially as described.

2. In a signaling system, the combination of a plurality of signaling-stations, each of which comprises a signaling device, an electric motor for moving the signal in each direction to one of several positions, a plurality of independent circuits passing through said motor corresponding to the number of signal positions and each, when energized, causing said motor to positively move the signal to a certain, definite position, means for locking the signal positively in each position controlled by said respective circuits, and means for successively energizing the circuits in a determined order through a traveling contact to first release the signal and then energize one of said motor-windings to move the signal to the corresponding position, substantially as described.

3. In a signaling system, the combination of a plurality of stations each having a movable signaling device and a motor controlling it, means for locking the signaling device in its signaling position, and a plurality of independent circuits, each including a different part of the motor and a locking means and when energized causing the locking means to be released and the motor to move the signal to a certain, definite position according to the part of the motor energized, substantially as described.

4. In a signaling system, the combination of a plurality of stations, each of which comprises a signaling device, a motor adapted to move the same to a plurality of signaling positions, and locking devices for locking said signal in the respective positions; a plurality of independent circuits each of which includes one of said locking devices and the motor at one of said stations, connections between the circuits of the several stations, and means controlled by the car at one station, for closing one of said circuits at two or more stations to release one of said locking devices and move the motor until stopped by the next locking device, substantially as described.

5. In a signaling system, the combination of a plurality of stations, each of which comprises a signaling device, a motor adapted to move the same to a plurality of signaling positions, locking devices for locking said signal in the respective positions only one being operative at a time, magnets for operating the respective locking devices, a plurality of independent circuits each of which includes said motor and one of said magnets, and means controlled by the car for closing the respective circuits, substantially as described.

6. In a signaling system, the combination of a signal-operating shaft, three disks mounted upon said shaft, three arms engaging the said disks and having locking devices for locking the disks in determined positions, and magnets for actuating the respective locking-arms, only one of said arms locking its disk at a given time, substantially as described.

7. In a signaling system, the combination of a signal-operating shaft, a plurality of locking-arms, each of which is, at different times, adapted to lock said shaft against movement when in engagement therewith, a pair of magnets adjacent to each of said locking-arms and adapted to move the same into or out of engagement with the shaft according as one or the other of said magnets is energized, a motor adapted to move said shaft, and connections for establishing circuits through the respective magnets and through the motor, substantially as described.

8. In a signaling system, the combination of a plurality of stations, each of which comprises a signaling device, and a motor adapted to move the same to a plurality of signaling positions; a plurality of independent circuits between said stations, and including said motor, each of which circuits controls the movement of said motor to a particular signaling position, and means whereby when a car enters one of said stations the proper circuits are closed to cause the motors at said station and the station behind to move the signaling device at said stations to a determined position, substantially as described.

9. In a signaling system, the combination of a plurality of signaling stations, each of which comprises a signaling device and a motor adapted to move the same positively in each direction, a plurality of independent circuits each of which includes a separate winding of said motor, locking mechanism for said motor to control a particular portion of its movement, and means carried by the car for closing the respective circuits in a determined order to release the locking mechanism and move the motor to a corresponding position, substantially as described.

10. In a signaling system, the combination with a signaling device, of a motor for moving the same, means for operating said motor, independent locking devices for locking the signal in each position, and independent circuits for controlling the respective locking devices, substantially as described.

11. In a signaling system, the combination with a signaling device, of a motor adapted to move the same, independent locking devices for limiting the movement of said signaling device, and means for successively establishing circuits through said motor and a corresponding locking device, substantially as described.

12. In a signaling system, the combination with a signaling device, a motor adapted to move the same, locking devices for locking said signal in its various positions, contacts adapted to be engaged by the car, said contacts corresponding to the various signal positions, and circuits from said contacts to the respective locking devices and through the motor, substantially as described.

13. In a signaling system, the combination with a signaling device, a rock-shaft upon which said signaling device is mounted, independent locking devices for preventing movement of said rock-shaft, a motor for moving said rock-shaft, and independent means for actuating the respective locking devices and the motor, substantially as described.

14. In a signaling system, the combination with a signaling device, of a rock-shaft upon which said signaling device is mounted, locking devices adapted to lock said rock-shaft against movement, a motor for moving said rock-shaft, magnets for actuating the respective locking devices, and means for establishing circuits through the respective magnets and the motor, substantially as described.

15. In a signaling system, the combination of a plurality of stations each of which comprises a signaling device and a motor adapted to move the same to any one of a plurality of signaling positions, a plurality of independent circuits between said stations and including the motor at one of said stations, each of said circuits controlling the movement of the motor to a particular signaling position, and means whereby when a car reaches a determined point in one of said stations, the proper circuit will be closed to actuate the motor at the station ahead to move the signaling device at said station to the caution position, and to actuate the motor at the station behind to move the signaling device at said station to the safety position, substantially as described.

16. In a signaling system, the combination of a plurality of signaling-stations each of which comprises a motor and a movable signal, a plurality of normally open electric circuits for operating the motor, an electrically-actuated registering device for indicating the number of circuits energized at each station, carried by the car, means for energizing said circuits successively and for actuating the registering device, substantially as described.

17. In a signaling system, the combination with a plurality of signal-stations and a plurality of normally open circuits connecting said stations, of a car carrying a contact adapted to close said circuits successively at each station, a registering device on the car actuated by an electromagnet whenever said circuits are closed, substantially as described.

18. In a signaling system, the combination of a plurality of signaling-stations, each of which comprises a signaling device, a motor to move the same positively in each direction, a plurality of independent circuits through said motor each of which circuits controls an independent locking device for said motor, and also the movement of said motor and signal to a particular position, and means carried by the car for closing the respective circuits in a determined order to release said locking device and move the signal to the next position, substantially as described.

19. In a signaling system, the combination with a movable signal of independent means for locking said signal in different positions, independent means for controlling each locking device and for moving the signal to a particular position, and means for actuating said devices in a determined order, substantially as described.

20. In a signaling system, the combination of a plurality of signaling-stations each of which comprises a signaling device and a motor adapted to move it positively in each direction, a plurality of independent circuits each including separate windings of said motor and separate locking-magnets for said motor-shaft, latches controlled by said locking-magnets for engaging said shaft to prevent rotation thereof, and means carried by the car for successively closing and opening the respective circuits in a determined order to thereby control said respective locking devices and also to actuate the motor to the corresponding position, substantially as described.

21. In a signaling system, the combination of a plurality of signaling-stations, each of which comprises a signaling device, a motor for moving the same positively in each direction to any one of a plurality of signaling positions, a plurality of independent circuits, each of which includes separate windings of said motor and corresponding to the number of signaling positions, means whereby each circuit when closed will move said motor to the corresponding signaling position, means for successively closing said circuits through the agency of a traveling contact carried by the car, and means for positively locking the motor at one station to prevent movement thereof until the car has reached the next station, substantially as described.

22. In a signaling system, the combination of a plurality of stations, each of which comprises a signaling device, a motor adapted to move the same to a plurality of signaling positions, locking devices for locking said signal in the respective positions, magnets for operating the respective locking devices, a plurality of independent circuits each of which includes said motor and one of said magnets, one of said magnets being differentially wound, and means controlled by the car, for closing the respective circuits, substantially as described.

23. In a signaling system, the combination of a plurality of stations, each of which comprises a signaling device, a motor adapted to move the same to a plurality of signaling positions, locking devices for locking said signal in the respective positions, magnets for operating the respective locking device, a plurality of independent circuits each of which includes said motor and one of said magnets, one of said magnets being differentially wound, means controlled by the car for closing the respective circuits, and connections between the differentially-wound coils of the several stations whereby when a circuit is established through the same the differential coils at one station will be in multiple and those at another station will be in series, substantially as described.

24. In a signaling system, the combination of a plurality of stations, each of which comprises a signaling device, a motor adapted to move the same, a locking device for locking said signal, and a magnet controlling said locking device, said magnet having differentially-wound coils; electric circuits through the magnet and the motor at the respective stations and connections between the circuits at the respective stations whereby said differential coils are in multiple at one station and in series at another, substantially as described.

25. In a signaling system, the combination of a plurality of stations, each of which stations has a signaling device, a motor to move the same, three contacts, a circuit from the first contact through the motors at the stations ahead and behind adapted to cause the motors to move the signals at said stations to safety position, a circuit from the second contact to the motor at the station ahead adapted to cause said motor to move the signal at said stations to caution position, and a circuit from said third contact through the motors at that station and the station ahead adapted to cause said motors to move the signals at said stations to danger position, substantially as described.

26. In a signaling system, the combination of a signal-operating shaft, locking-arms adapted to lock the same in determined positions, magnets for operating the respective locking-arms, said magnets each comprising a central core, an annular body surrounding the same and magnetically connected therewith, and a coil interposed between said core and said annular body, and a motor for turning said shaft, and means for establishing a circuit through said motor and one or more of the magnets, substantially as described.

27. In a signaling system, the combination with a car of a plurality of active signaling-stations, one being in advance of the car and one being in the rear of the car, each signaling-station comprising a motor and a movable signal adapted to stay in a plurality of positions, a motor for moving said signal, a plurality of circuits leading to the motor, each circuit controlling a certain position of the signal, a registering device on the car controlled by circuits connected with said signal, and means on the car for energizing said circuits and causing said registering device to record the number of signals actuated by the car, substantially as described.

28. In a signaling system, the combination with a car, of a plurality of active signaling-stations, a signal at each station, a motor for rotating said signal, a plurality of circuits for energizing and rotating said motor, each circuit causing the motor to assume a certain position, and means for moving said signal according to the movement of the car relatively to the stations, substantially as described.

29. In a signaling system, the combination of a plurality of signaling-stations each of which comprises a signaling device and a motor for moving the same to various signaling positions, an independent locking mechanism for each position of said signal, a plurality of independent circuits each of which includes one of said locking devices, said circuits corresponding in number to the signaling positions, means whereby each circuit when completed will release one of said locking devices, and means whereby upon such release of one of said locking devices the signal is moved to the next signaling position and automatically locked in such position, substantially as described.

In testimony whereof I affix my signature in presence of two witnesses.

FRANK B. RAE.

Witnesses:
C. V. EDWARDS,
HENRY BEST.